8740X
W. G. Johnston,
Thrashing Mach.
Patented Apr. 3. 1835.
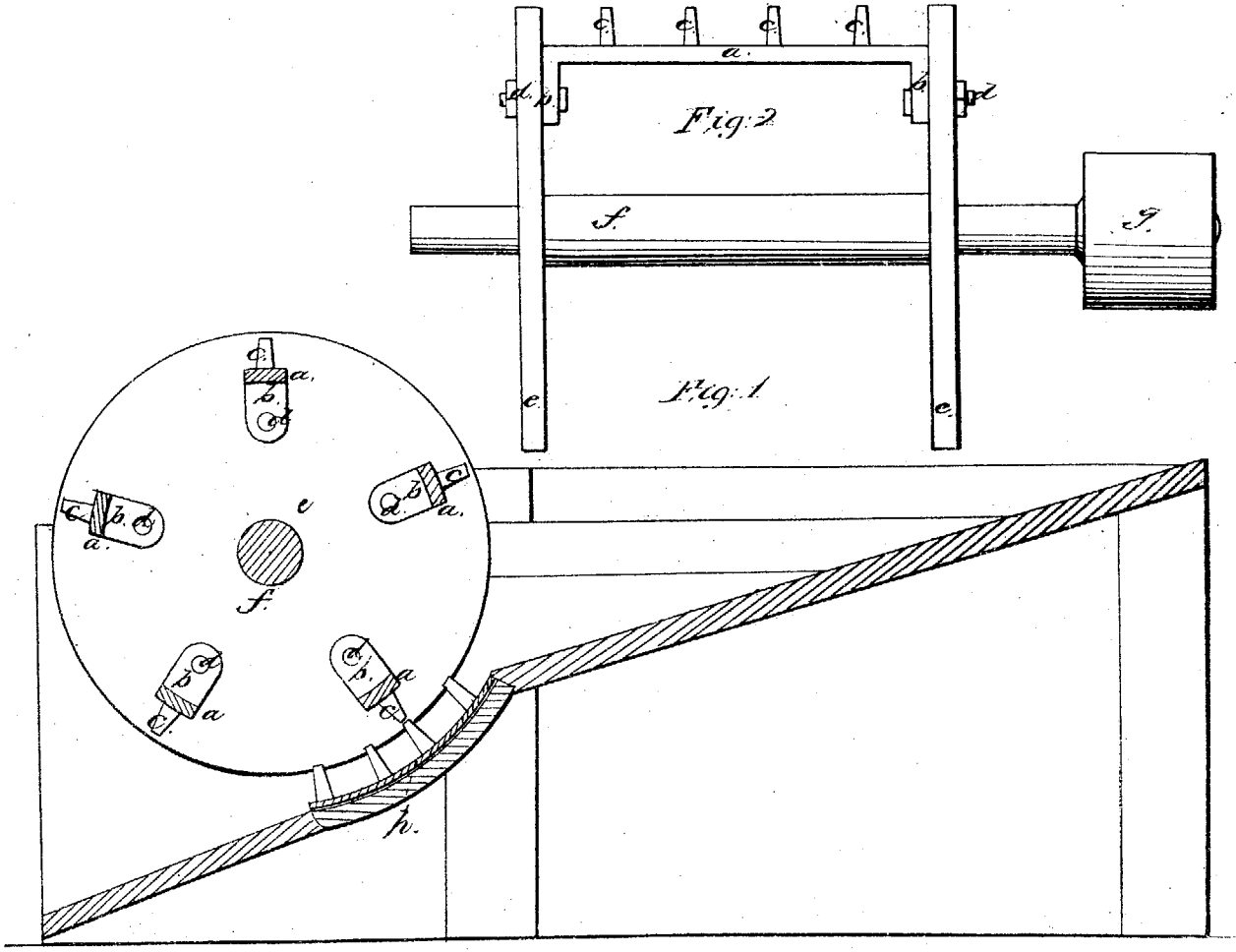

William G. Johnston, of Bridgeton N.J.

Letters Patent.

The Schedule referred to in these Letters Patent and making part of the same, containing a description in the words of the said William G. Johnston himself of his improvement in a Machine for separating grain from the heads of straw. called, Johnstons Thrashing Machine.

Be it known that I, William G. Johnston of Bridgeton, County of Cumberland, and State of New Jersey, have made an improvement in the useful arts, being a Machine for seperating grain from the heads of straw, called Johnstons Thrashing Machine, which is described as follows. This Machine is similar in many respects to other revolving Thrashing Machines where the grain is rubbed out from the heads and hulls by means of projecting teeth or points fixed on a cylinder or drum. and a section of a hollow cylinder with teeth called the bed. This arrangement forms no part of my invention.

What I do claim as my peculiar invention and wish to secure by Letters Patent consists in having the bars of iron containing the teeth to turn on centers whenever abstructed by hard substances such as on stones &c. getting between the cylinder and concave so that the teeth are preserved from being broken by the turning of these bars. The bars in which the teeth are inserted extend from head to head of the drum or having crank shoulders at each end and round openings through which the centers or screw bolts are inserted which centers first pass through the heads of the cylinder cylinder; and the bars can be tightened or loosened
by nuts put on the inner or outer ends of the screw
bolts. These bars act similar to permanent bars
till the hard substance enters the Machine when
they turn as before mentioned. This forms the chief
part of my invention. The other smaller improvements
I shall not here notice.

For a farther illustration of my invention
I refer to the model and drawing of the same as
deposited in the Patent Office.

Witnesses — William G. Johnston
Wm. P. Elliot.
Clement Foote. — 360 [illegible]

Drawing

Model rec'd